Figure 3:
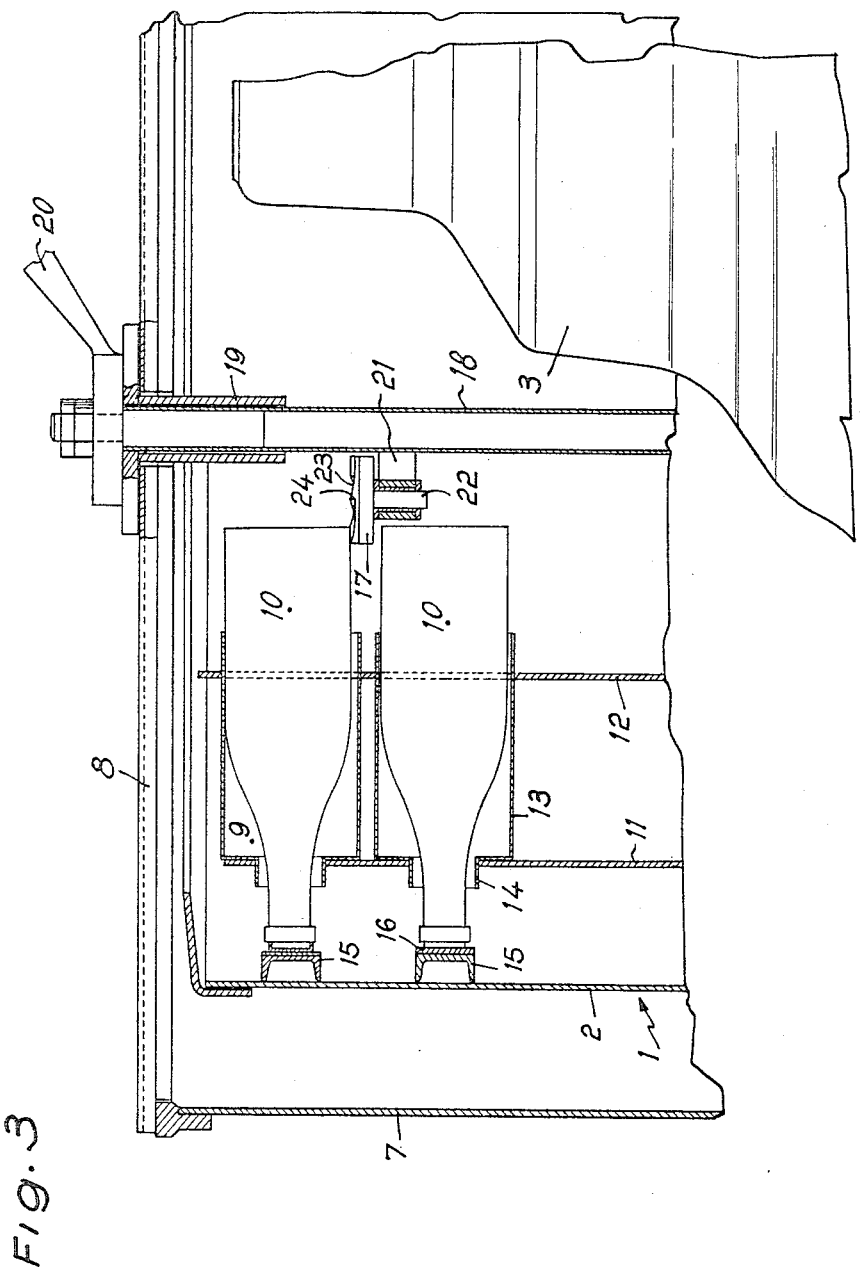

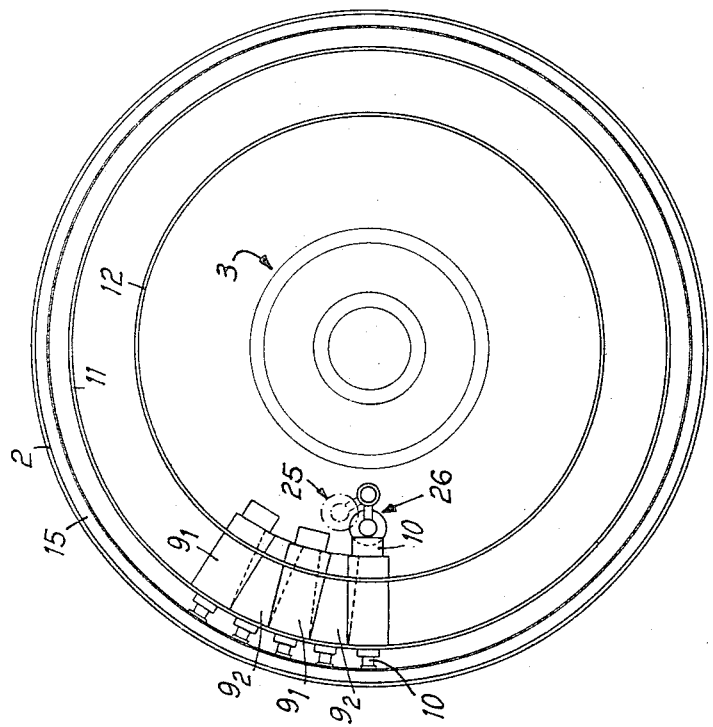
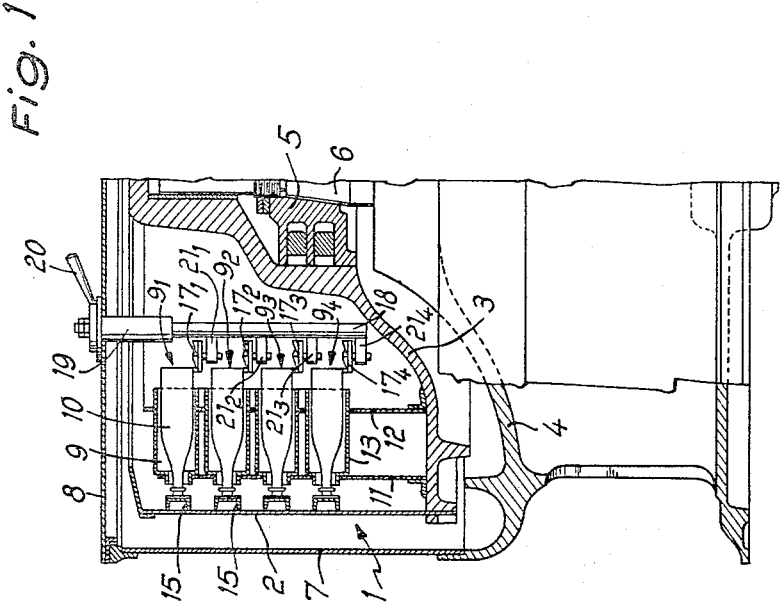

United States Patent Office 3,313,479
Patented Apr. 11, 1967

3,313,479
AUTOMATIC DEVICE FOR PLACING IN SUSPENSION THE CRUST OF A LIQUID CONTAINED IN BOTTLES AND PRECIPITATING IT ON TO THE STOPPERS THEREOF
Georges Grauss, 21–21 Blvd. de Port-Royal, Paris, France
Filed Apr. 20, 1965, Ser. No. 449,423
Claims priority, application France, Apr. 21, 1964, 971,627
6 Claims. (Cl. 233—5)

Present-day treatments for clarifying champagne wines or other fermented sparkling beverages prepared in accordance with the champagne method involve great difficulties, due on the one hand to the expensive requirement for specialised labour for stirring purposes, and on the other hand to the operation of standing up at an angle, which involves setting up clumsy and bulky racks. These treatments furthermore take a long time, one to two months, and are consequently costly. At the end of this period, the products in suspension in these beverages are encrusted on the stoppers of the bottles, and are then eliminated by extracting the sediment-coated stoppers.

There is also automatic equipment comprising on the one hand a shaker conveyor intended to agitate the bottles so that the internal crust shall be placed in suspension in the liquid in them, and on the other hand a centrifuge which tends to precipitate the product in suspension on to the stoppers of the said bottles. The basket of this centrifuge comprises a plurality of annular layers of radial sheaths intended to hold the bottles to be treated. For this purpose, each tubular sheath is slit in order to grip in elastic fashion the bottle intended to be accommodated in it, and is equipped with a reinforced rubber rim against which centrifugal force brings to bear the bulging part of the bottle under consideration which links the neck to the body. It will therefore be seen that the equipment comprises two independent devices, one for shaking and the other for centrifuging, and that all the bottles are firmly held in the centrifuge.

The present invention relates to an automatic device for placing in suspension the crust of a liquid contained in bottles and precipitating it on to the stoppers thereof, without any intermediate handling and in a very short time of treatment.

According to the invention, the device comprises a combination of the following, in a single centrifuging basket:

On the one hand, substantially radial cavities, distributed in at least one layer at the rim and intended to accommodate the bottles, allowing them some play, their stoppers being brought to bear against the lateral wall of the basket, On the other hand, at least one notched disc loosely mounted on a fixed but retractable supporting element, so that when this disc is in the operational position its notched peripheral portion is on the path described by the corresponding bottoms of the bottles so as to tend to stir them by lifting, lowering and turning them, the driving mechanism for the basket having two operational speeds: a slow speed for stirring and a fast speed for centrifuging.

In one particularly advantageous form of embodiment, the device comprises at least one vertical shaft mounted in pivoting fashion with respect to the cover of the centrifuge and equipped with an external handle, this shaft being fast with as many radial levers as there are layers of cavities, and these levers carrying at the end loose notched discs. Each notched disc may comprise asymmetrical toothing at the rim, the rising flanks of the said toothing having a gentle slope, and the falling flanks having a steep slope.

According to a first possibility, the basket of the centrifuge, whether or not it is detachable, comprises a cylindrical lateral wall and two intermediate concentric hoops fast with the rotary hub, the hoops being linked in order to constitute the cavities under consideration by closed radial tubular sheaths distributed in a plurality of superposed layers and having a diameter at all points greater than that of the bottles.

According to a second possibility, the basket of the centrifuge, whether or not it is detachable, comprises partitions inside its lateral wall, enabling conveyor baskets for the bottles to be held in place, these baskets forming a group of the cavities under consideration, from which cavities the bottoms and necks of these bottles project.

Various other features of the invention will moreover become apparent from the following detailed description.

One form of embodiment of the subject of the invention is illustrated by way of non-limitative example in the appended drawing.

In this drawing:
FIGURE 1 is a vertical part-section through a centrifuge using the device of the invention,
FIGURE 2 is a plan view from above of the basket of this centrifuge,
FIGURE 3 is a part-section similar to FIGURE 1 showing on a larger scale some details of embodiment.

The device of the invention is almost completely accommodated in a centrifuge basket 1, whether this basket is detachable as illustrated in the drawing or not. In the example illustrated, the basket 1 comprises a perforated lateral cylindrical wall 2 fast with the lower part of an intrinsically known hub 3. This hub, which forms a base, is supported in detachable fashion by a frame 4, and is capable of being coupled, for example via a centrifugal clutch 5, to a driving shaft 6 having rotation imparted to it by any appropriate means accommodated in the said frame. Starting from now, it is important to note that the shaft 6 may be moved at two different speeds of rotation: a slow speed used for stirring purposes, and a fast speed used for centrifuging purposes. Moreover, the frame 4, together with a cylindrical external envelope 7, constitutes a bowl which is formed at the top by a detachable cover 8 subject to the action of particularly efficacious locking means.

According to the invention, the device comprises first of all in the basket 1 cavities 9 which are substantially radial and distributed in at least one layer at the rim, in four superposed layers 9.1 to 9.4 in the example illustrated. These cavities are intended to accommodate the bottles 10 to be treated, with sufficient play to enable them to be lifted, lowered and driven in rotation upon themselves. The cavities 9 may naturally be distributed in successive layers in different ways, or they may be disposed in perpendicular relationship to one another (FIGURES 1 and 3), or they may be disposed in staggered relationship from one layer to another (FIGURE 2), more particularly enabling a larger number of bottles to be accommodated in a given space.

In the form of embodiment illustrated in the drawing, the basket 1 comprises two intermediate hoops 11 and 12 fast at the bottom with the hub 3, and concentric with the lateral wall 2 of the said basket. In order to constitute the cavities 9, the hoops 11 and 12 are linked by tubular sheaths 13, which are closed, that is to say not elastically deformable. The sheaths 13 are cylindrical from the hoop 11 towards the axis of the basket 1, and are extended from this hoop to the exterior by a constricted collar 14 surrounding, with a very large amount of play, the necks of the bottles 10 capable of being accommodated in these sheaths. The latter are then fixed by any appropriate means to the hoops 11 and 12. It goes without saying that the bases of the sheaths 13, in the vicinity of their collars 14, may be provided with rings of flexible material intended not to hold the bottles rigidly, but to damp out any excessive vibration which there may be.

The centrifugal force acting on the bottles hence brings their stoppers firmly to bear against abutments in the basket 1. Since there are different types of stoppers which project to varying heights with respect to the neck of the bottles, the abutments for these stoppers may take the form of: the lateral wall 2 itself, in the case of cork champagne stoppers, or annular rims 15 attached to the said lateral wall 2 facing the collars 14 of the sheaths 13, in the case of thinner stoppers made of cork, plastic material or other substances, or metal capsules.

The rims 15 may take the form of curved profiled metal pieces fixed to the wall 2 and equipped with bracing bands 16 made of flexible material of variable thickness.

According to another form of embodiment not illustrated in the drawing, the basket 1 of the centrifuge comprises inside its lateral wall 2 partitions bounding between them recesses in which conveyor baskets for the bottles are located. These baskets comprise compartments forming a group of the cavities 9 under consideration. It is quite clear that the necks and bottoms of the bottles 10 must project on both sides of the aforementioned compartments, as is the case with the sheaths 13 in the foregoing form of embodiment. In the foregoing baskets, the bottles are preferably arranged in rows parallel to one another, so that the presence of the internal partitions causes the centrifuge basket 1 to be perfectly balanced.

According to the invention, the device also comprises at least one notched disc 17 at the lower level of each of the layers of cavities. In the example illustrated by way of non-restrictive example, there is one such disc per layer, or in other words four discs 17.1 to 17.4 for the layers 9.1 to 9.4.

Each disc is loosely mounted on a fixed but retractable supporting element, so that in the operational position of this disc its notched peripheral portion is on the circular path described by the corresponding bottoms of the bottles 10. While on this subject, and in the form of embodiment illustrated in the drawing, the device comprises a tubular vertical shaft 18 mounted in pivoting fashion at the top in a sleeve 18 comprised in the cover 8, and equipped outside the latter with a handle 20 capable of assuming two positions. The shaft 18 is fast with as many levers 21 as there are layers of cavities. In other words, in the example illustrated the shaft 18 comprises four radial levers 21.1 to 21.4, at the ends of which are loosely mounted the journals 22 of the notched discs 17.1 to 17.4.

It is essential for each disc 17 to comprise annular undulations in order to impart a stirring action to the bottles 10 in the corresponding layer by lifting and lowering them and turning them on themselves. Under these conditions, stirring is possible only if the bottles 10 are free to move in the cavities 9, whether the latter are bounded by sheaths 13 or by the compartments of the conveyor baskets. As will be clearly apparent from FIGURE 3, each disc 17 may comprise asymmetrical toothing at the rim, the rising flanks 23 having a gentle slope and the falling flanks 24 having a steep slope. By virtue of this shape, each bottle which encounters the corresponding notched disc is lifted by the rising ramp 23 in this disc facing it, and simultaneously tends to turn on itself and to impart rotation to the said disc. It then escapes to the following falling ramp 24, and falls without turning. It is quite clear that if the bottle is not to be broken its vertical displacement must be relatively small (a few millimetres), and that the toothing on the disc 17 must be made of a material which is not too hard, such as fibre.

The following procedure is carried out in order to use the device according to the invention. In a first period, the bottles 10 are arranged in rows in the cavities 9 so that their stoppers are brought to bear against the lateral wall 2 of the basket 1 or the rims 15. The cover 8 is then closed and locked to the bowl of the centrifuge, the shaft 18 having previously placed in a position 25 such that the discs 17.1 to 17.4 are out of reach of the bottoms of the bottles. In a second period, the handle 20 is operated so that the discs 17.1 to 17.4 are brought into the position 26 in which they are situated at the edge of the circular path described by the bottoms of the bottles. The driving shaft 6 is then driven at slow speed by its propulsive unit, and drives the basket via the clutch 5. This imparts vibration and circular motion to the bottles 10 as their bottoms pass over the notched discs 17.1 to 17.4, tending to place in suspension the crust which it is required to eliminate. In a third period, the handle 20 is returned to its position 25 so that the discs 17.1 to 17.4 can no longer encounter the bottles 10. The shaft 6 is then driven at fast speed by its propulsive unit, so that the said shaft itself drives the basket 1, thus centrifuging the contents of the bottles with the result that the suspension is precipitated on to the stoppers of the bottles.

When centrifuging is finished, the propulsive unit is stopped, and when the basket 1 has been immobilised by progressive braking the cover 8 is opened. The bottles 10 are then removed, and their sediment-coated stoppers are extracted.

The invention is not limited to the form of embodiment illustrated and described in detail, since various modifications may be made to it without departing from its scope.

I claim:

1. Automatic device for placing in suspension the crust of a liquid contained in bottles and precipitating it on to the stoppers thereof, characterised in that it comprises a combination of the following, in a centrifuging basket:
   on the one hand, substantially radial cavities, distributed in at least one layer at the rim and intended to accommodate the bottles, allowing them some play, their stoppers being brought to bear against the lateral wall of the basket,
   on the other hand, at least one notched disc loosely mounted on a fixed but retractable supporting element, so that when this disc is in the operational position its notched peripheral portion is on the circular path described by the corresponding bottoms of the bottles so as to tend to stir them by lifting them, lowering them and turning them, the driving mechanism for the basket having two operational speeds: a slow speed for stirring and a fast speed for centrifuging.

2. Device according to claim 1, characterised in that it comprises at least one vertical shaft mounted in pivoting fashion with respect to the cover of the centrifuge and equipped with an external handle, this shaft being fast with as many radial levers as there are layers of cavities, and these levers carrying at the end loose notched discs.

3. Device according to claim 1, characterised in that each notched disc under consideration comprises asymmetrical toothing at the rim, the rising flanks of the said toothing having a gentle slope, and the falling flanks having a steep slope.

4. Device according to claim 1, characterised in that the basket of the centrifuge, whether or not it is detachable, comprises a cylindrical lateral wall and two concentric intermediate hoops fast with the rotary hub, the hoops being linked in order to constitute the cavities under consideration by closed radial tubular sheaths distributed in a plurality of superposed layers and having a diameter at all points greater than that of the bottles.

5. Device according to claim 1, characterised in that the basket of the centrifuge, whether or not it is detachable, comprises partitions inside its lateral wall, enabling conveyor baskets for the bottles to be held in place, these baskets forming a group of the cavities under consideration, from which cavities the bottoms and necks of these bottles project.

6. Device according to claim 1, characterised in that the lateral wall of the basket of the centrifuge is capable of being equipped with interchangeable annular rims of variable thickness, constituting abutments for the stoppers of the bottles.

References Cited by the Examiner
UNITED STATES PATENTS
1,082,297  12/1913  Wheeler _____ 233—5

M. CARY NELSON, *Primary Examiner.*

H. KLINKSIEK, *Assistant Examiner.*